H. C. SCHROEDER.
COMPENSATING AIR PUMP FOR PNEUMATIC VEHICLE WHEELS.
APPLICATION FILED JAN. 3, 1918.
1,285,808.
Patented Nov. 26, 1918.
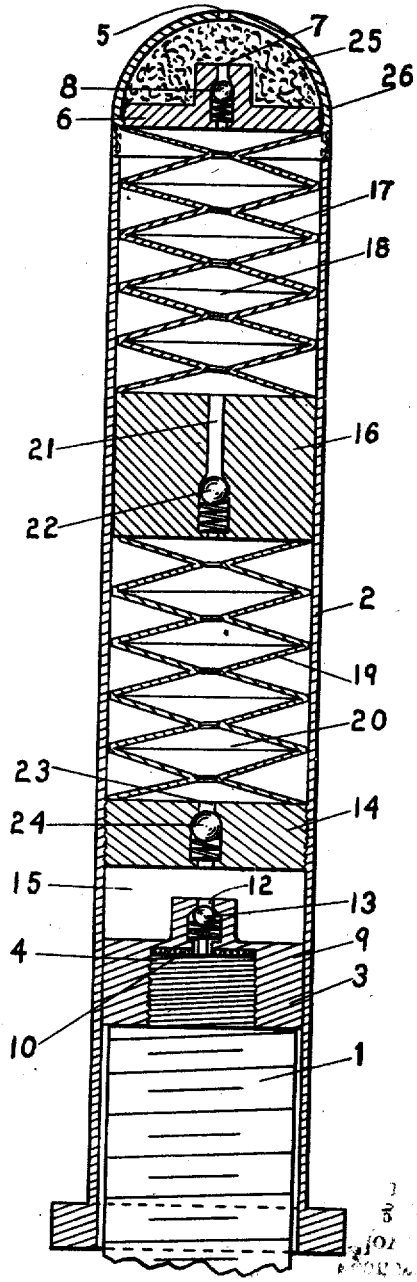
Inventor
Henry C. Schroeder

UNITED STATES PATENT OFFICE.

HARRY C. SCHROEDER, OF BERKELEY, CALIFORNIA.

COMPENSATING AIR-PUMP FOR PNEUMATIC VEHICLE-WHEELS.

1,285,808. Specification of Letters Patent. Patented Nov. 26, 1918.

Application filed January 3, 1918. Serial No. 210,193.

*To all whom it may concern:*

Be it known that I, HARRY C. SCHROEDER, citizen of the United States, residing at Berkeley, in the county of Alameda and State of California, have invented certain new and useful Improvements in Compensating Air-Pumps for Pneumatic Vehicle-Wheels, of which the following is a specification.

My invention is a compensating air pump for pneumatic vehicle tires.

More particularly my invention contemplates a pump of this type arranged entirely within the cap of the tire valve.

The figure in the drawing is a longitudinal section of my invention attached to the valve of a pneumatic tire.

In the drawing 1 indicates the valve of a pneumatic tire and 2 the cap therefor. The cap 2 is formed with an internally threaded internal flange 3 which screws onto the tire valve nipple 4. The outer end of the cap 2 is provided with an inlet port 5. A head 6 is arranged in the outer end of the cap which head is provided with an inlet port 7 controlled by an inlet valve 8. A head 9 is arranged within the cap near its inner end which head rests over the valve nipple in engagement with a washer 10 on top of the nipple. Said head is provided with a port 12 controlled by a valve 13, which port communicates with the valve 1. A head 14 is arranged above the head 9 in the cap 2, providing an air reservoir 15 between said heads, from which reservoir the port 12 leads. A weighted head 16 is arranged to reciprocate in the cap between the heads 14 and 6. A diaphragm or bellows 17 is interposed between the head 6 and the weighted head 16 and forms an air inlet chamber 18. A diaphragm or bellows 19 is interposed between the head 14 and the weighted head 16 and forms a compression chamber 20. The weighted head 16 is provided with a port 21 leading from the air inlet chamber 18 into the air compression chamber 20, which port is controlled by a valve 22. The head 14 is provided with a port 23 leading from the compression chamber 20 to the reservoir 15, which port is controlled by a valve 24. A packing 25 is interposed between the head 6 and the outer end of the cap 2 through which packing air may pass from the port 5 to the port 7 as desired.

The top 26 of the cap 2 screws into the upper end of the body of the cap and may be screwed off the cap body for assembling and removing the parts of the pump.

Normally the valves 8, 22, 24 and 13 are closed. During the rotation of the wheel on which my invention is applied the weighted head 16 is forced outwardly by the centrifugal force produced. As the wheel travels over irregularities in the road the vibration forces the weighted head inwardly. As the head is forced inwardly the bellows 17 expands and creates a vacuum in chamber 18, whereupon valve 8 opens and air enters said chamber through port 5, packing 25, and port 7. As the head moves outwardly the bellows 17 and chamber 18 contract, whereupon the valve 22 opens and air passes from chamber 18 through port 21 into chamber 20, the valve 8 remaining closed. When the air pressure in chamber 20 becomes greater than a predetermined degree, say 80 lbs., the valve 24 opens and admits air from said chamber through port 23 into air reservoir 15, until the pressure in chamber 20 is reduced to normal. When the air pressure in reservoir 15 exceeds a predetermined degree say 90 lbs. the valve 13 opens and air passes from the reservoir 15 through port 12 and opens the tire valve 1 and passes into the tire until the pressure in said reservoir is reduced to normal.

Having thus explained the nature of the invention and described an operative manner of constructing and using the same, although without attempting to set forth all of the forms in which it may be made, or all of the forms of its use, what is claimed is:—

1. In combination with a pneumatic tire valve, a pump including an air compression chamber communicating with said tire valve, a pair of bellows, a weighted head interposed between said bellows, means for admitting air into one of said bellows, means for admitting air from said bellows into the other bellows when the first bellows is compressed, and means for admitting air from the second bellows into said compression chamber.

2. A pump of the character described comprising a cap having means at one end for providing a compressing chamber and an air inlet opening at the other end, a reciprocable weight, air induction and eduction members operated by said weight, and means controlled by the air pressure within said members for controlling passage of air to said compressing chamber.

3. A pump of the character described comprising a cap having upper and lower partitions provided with openings therethrough, a weight mounted to reciprocate between said partitions, air induction and eduction members attached to said partition and to said weight, and means controlled by air pressure within said members for controlling the passage of air through said partition.

4. A pump of the character described comprising a cap having upper and lower partition edges provided with an opening, a weight mounted to reciprocate between said partitions, bellows attached to said weight and to the respective partitions, and means controlled by the air pressure within said bellows for controlling the passage of air through said partitions.

In testimony whereof I affix my signature.

HARRY C. SCHROEDER.